Dec. 13, 1960        R. H. BOWERS ET AL        2,964,299
MIXING APPARATUS
Filed Feb. 10, 1959
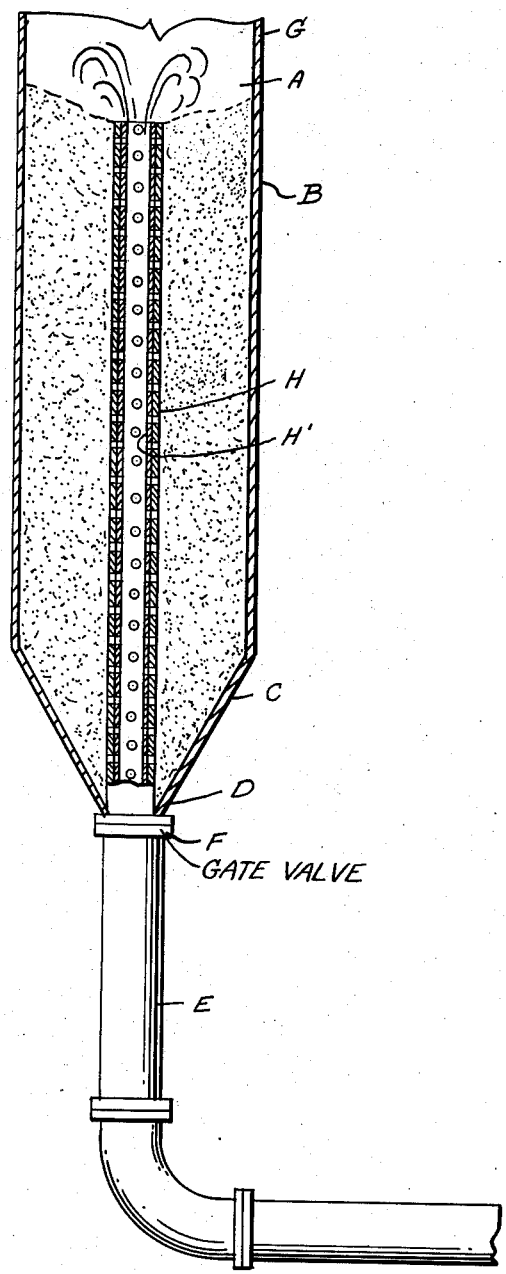
INVENTORS
Roy Holt Bowers
John Williams Stevens
Robert David Suckling
BY Cushman, Darby & Cushman
ATTORNEYS 2,964,299
MIXING APPARATUS Roy Holt Bowers, Robert David Suckling, and John William Stevens, Manchester, England, assignors to Imperial Chemical Industries Limited, London, England, a corporation of Great Britain Filed Feb. 10, 1959, Ser. No. 792,425

4 Claims. (Cl. 259—4)

This invention relates to a mixing apparatus for solid particles.

Various methods have hitherto been used for mixing solid particles but these methods suffer from many disadvantages; for example, mechanical blenders are useful only on batch sizes up to 2000 cubic feet at which size the mechanical design of the container and drive transmission system is complex, due to high power inputs. Furthermore methods hitherto used require moving parts to mechanically agitate the solids and at least one mixing container is required in conjunction with a storage container. Mixing times are relatively long with the result that up to 40 H.P. hours per ton of solid are often needed to achieve adequate mixing.

It is an object of the present invention to provide an improved mixing apparatus having no moving parts. A further object of the invention is to provide a mixing apparatus which may be made from a suitable existing storage container thereby eliminating the use of separate mixing and storage containers. Still further objects of the invention are to provide a mixing apparatus which gives through and intimate mixing of solid particles and which is capable of handling larger batch sizes and also having a lower power consumption than mixers used hitherto.

Thus according to the invention we provide a mixing apparatus for solid particles which comprises a container provided at its lowermost point with an orifice or jet through which a fluid may be passed under pressure and projected in a substantially vertical direction, and provided at or near the top with an exit for the fluid.

The container may conveniently be square but it is preferably circular in cross section. The side-walls of the container are usually vertical and of length at least 2 times and preferably at least 5 times the maximum width of the container. The base of the container may be of any convenient shape depending on the cross-section of the container and for thorough mixing of the contents is preferably attenuated; thus for example when the cross section is circular then the base may be hemispherical or conical, the included angle of the cone being dependent on the solid material to be mixed, in that the greater the angle of repose of the solid material the smaller the optimum included angle of the cone.

Further according to the present invention we provide means of reducing the pressure required to initiate the spout of fluid under pressure since this is always greater than the running pressure. A convenient way of doing this is to provide a central tube of diameter substantially equal to that of the jet and containing holes which can be closed whilst the bed is charged and opened as soon as the fluid pressure has been applied. The tube extends from the jet to the bed surface. The solid material passes through the holes in the central tube and is carried up the tube by the fluid and overflows at the top of the tube back into the main body of the container.

The mixing apparatus according to the invention may advantageously be used for mixing any solids, and it is particularly useful for blending polymer chips. As examples of polymer chips there are mentioned polythene, nylon and polyethylene terephthalate. When polymeric materials are to be used for the manufacture of artificial fibers then the polymer is initially made in the form of small lumps or chips which require blending to obtain improved uniformity in the spun fibres. By the commonly used methods for blending polymer chips, using mechanical stirrers, the horsepower consumption per ton of polymer chips to obtain complete mixing is of the order of 14 and the time taken for complete mixing about 30 minutes. Using the mixing apparatus of this invention the horsepower consumption for complete blending can be reduced. It has been found that optimum results are obtained when the jet diameter is about one eighth of the bed diameter.

Under these conditons, the horsepower consumption per ton of solids remains substantially constant as the diameter of the blender increases whereas the time required for blending increases as the blender size increases. For example, for most purposes the horsepower consumption will be about 5 H.P. per ton blended and the blending times may lie between 120 and 10 minutes giving total power inputs between 1 and 10 H.P. hours per ton.

The solid particles to be blended together in the mixing apparatus are introduced into the container, outside the central tube, if one is fitted, by any convenient means, for example pneumatic conveying at or near the top of the container.

The solids are mixed in the apparatus by passing a fluid into the bed of solids via the orifice or jet in the base of the container. Any fluid may be used, either liquid or gaseous. Liquid fluids are conveniently used when the solid particles are very large or of very high density, and the liquid is taken from the container by means of an overflow in the side of the container, situated at a convenient height above the height to which the solids reach whilst being agitated, and optionally recycled. Similarly gaseous fluids may be either recycled by passing the gas through the solids and out of a convenient outlet at or near the top of the container or optionally the gas may be dissipated into the atmosphere. The preferred fluid is air, which can readily be dissipated into the atmosphere after passing through the solids.

The fluid is projected upwards through the bed of solid particles at such a rate that the solids are carried along with the jet stream of fluid and then fall out of the stream above the bed of solids. Any convenient bed-depth of solids to bed width may be used but the most stable fluid jet is obtained when the bed depth is from 2 to 5 times the maximum bed width. Mixing of the solid particles is rapid and occurs by two mechanisms, (a) end to end mixing due to solids being entrained by the fluid jet at all heights within the bed and (b) violent local mixing in the "umbrella" of solids formed just above the bed where the entrained solids fall out of the fluid stream.

Further advantages of this method of mixing solid particles are apparent. The blender may be constructed from a storage hopper fitted with the necessary jet or orifice and central tube, thereby dispensing with a separate mixing container, and apart from a compressor to supply the jet with fluid there are no moving parts. Furthermore this method of mixing may be used on any scale whereas, as already stated, mechanical mixing apparatus using stirrers are limited to batches of solids of less than about 2000 cubic feet capacity.

The invention may be illustrated by reference to the single figure of the accompanying drawing which reprents a vertical cross section of a typical mixing apparatus according to the invention. In the drawing A is a cylindrical container having parallel perpendicular side-walls B and also having an attenuated conical base C and an open top G. The conical base C has an orifice D at the lowermost point to which is connected a slide valve F, which in turn is connected to a pipeline E through which a jet of air is passed under pressure from a pump. H is a central slotted tube in which the slotted holes can be closed, for example by rotating a similar concentric slotted tube H' so that the slots in the two tubes fail to coincide.

The solid particles to be mixed, for example polymer chips, are introduced into the annulus between the container and the central tube via the open top after first ensuring that the slide valve and the holes in the tube are closed. The container is filled with solid particles up to a height approximately three times the diameter of the container. The slide valve is then opened, a jet of air is passed into the tube and the holes in the central tube are opened, the air velocity being such that a stable "umbrella" of entrained solids is formed just above the bed of solids. The air is dissipated into the atmosphere, after passing through the bed of solids, via the open top. After sufficient time to ensure thorough mixing of the solid particles the slide valve is closed and the flow of air is stopped. The solids are then removed from the container by disconnecting the pipeline from the container and allowing the solids to flow into any suitable vessel.

What we claim is:

1. Mixing apparatus for blending polymer chips, comprising: a container for said chips provided at its lowermost point with an orifice for introduction of a fluid under pressure, and provided at its top with an outlet for said fluid; a tubular member having a diameter approximately equal to that of said orifice extending substantially vertically of the container and communicating the orifice and outlet; said tubular member having a plurality of holes along its length for communicating its interior with the interior of the container, when the fluid therein is at operating velocity; and means for blocking said holes prior to the container being charged with chips.

2. Mixing apparatus as in claim 1, wherein said means comprises a second tubular member concentric with and contiguous to said first-mentioned tubular member, said second member having a plurality of holes along its length in alignment with the holes of said second member when said members are in a first relative rotative position, the holes of said members being out of alignment in a second relative rotative position thereof.

3. Mixing apparatus as in claim 2, wherein the container is circular in cross-section, and the base of the container is attenuated.

4. Mixing apparatus as in claim 2, wherein the height of the container is at least five times its maximum width, and the diameter of the orifice and tube is approximately one eighth of the diameter of the bed of chips in the container.

References Cited in the file of this patent

UNITED STATES PATENTS

| | | |
|---|---|---|
| 2,292,897 | Nielsen | Aug. 11, 1942 |
| 2,786,280 | Gishler et al. | Mar. 26, 1957 |